(12) United States Patent
Mathews et al.

(10) Patent No.: US 6,678,815 B1
(45) Date of Patent: Jan. 13, 2004

(54) APPARATUS AND METHOD FOR REDUCING POWER CONSUMPTION DUE TO CACHE AND TLB ACCESSES IN A PROCESSOR FRONT-END

(75) Inventors: Gregory S. Mathews, Santa Clara, CA (US); Edward T. Grochowski, San Jose, CA (US); Chih-Hung Chung, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 09/604,855

(22) Filed: Jun. 27, 2000

(51) Int. Cl.[7] ............................................. G06F 12/00
(52) U.S. Cl. ..................... 711/205; 711/137; 711/204; 711/206; 712/239; 713/320
(58) Field of Search .................. 712/239, 238, 712/237, 233; 713/324, 320; 711/205, 125, 206, 207, 204, 137

(56) References Cited

U.S. PATENT DOCUMENTS

| | | | |
|---|---|---|---|
| 5,228,131 A | * 7/1993 | Ueda et al. | 712/240 |
| 5,280,449 A | * 1/1994 | Oldham | 365/189.02 |
| 5,319,760 A | * 6/1994 | Mason et al. | 711/208 |
| 5,325,507 A | * 6/1994 | Freitas et al. | 365/49 |
| 5,603,037 A | * 2/1997 | Aybay | 713/322 |
| 5,604,877 A | 2/1997 | Hoyt et al. | |
| 5,617,348 A | * 4/1997 | Maguire | 365/49 |
| 5,666,537 A | 9/1997 | Debnath et al. | |
| 5,694,568 A | * 12/1997 | Harrison et al. | 711/213 |
| 5,699,543 A | 12/1997 | Saxena | |
| 5,701,448 A | * 12/1997 | White | 712/233 |
| 5,740,417 A | * 4/1998 | Kennedy et al. | 712/239 |
| 5,781,750 A | * 7/1998 | Blomgren et al. | 712/209 |
| 5,854,913 A | * 12/1998 | Goetz et al. | 712/210 |
| 5,860,106 A | * 1/1999 | Domen et al. | 713/324 |
| 5,860,145 A | * 1/1999 | Nogami | 711/207 |
| 5,996,083 A | * 11/1999 | Gupta et al. | 713/322 |
| 6,021,489 A | 2/2000 | Poplingher | |
| 6,026,476 A | 2/2000 | Rosen | |
| 6,079,003 A | * 6/2000 | Witt et al. | 711/200 |
| 6,125,444 A | * 9/2000 | Check et al. | 712/245 |
| 6,282,663 B1 | * 8/2001 | Khazam | 713/320 |

OTHER PUBLICATIONS

Intel, "P6C Microarchitecture Specification", pp 323–324, Jul. 29, 2000, Intel corporation, Santa Clara, California.*

* cited by examiner

Primary Examiner—Hong Kim
(74) Attorney, Agent, or Firm—Blakely, Sokoloff, Taylor & Zafman LLP (57) ABSTRACT

An apparatus and method for reducing power consumption in a processor front end are provided. The processor includes an instruction cache, a TLB, and a branch predictor. For sequential code execution, the instruction cache is disabled unless the next instruction fetch will cross a cache line boundary, thus reducing unnecessary accesses to the instruction cache. The TLB is disabled unless the next instruction fetch will cross a page boundary, thus reducing unnecessary TLB look-ups. For code branching, the branch predictor is configured to include, for each target address, an indication of whether the target address is in the same page as the corresponding branch address. When a branch occurs so as to cause access to a given entry in the branch predictor, the TLB is disabled if the target address is in the same page as the branch address.

16 Claims, 10 Drawing Sheets

APPARATUS AND METHOD FOR REDUCING POWER CONSUMPTION DUE TO CACHE AND TLB ACCESSES IN A PROCESSOR FRONT-END

FIELD OF THE INVENTION

The present invention pertains to power consumption in a processor front end. More particularly, the present invention relates to reducing power consumption due to cache and TLB accesses in a processor front-end.

BACKGROUND OF THE INVENTION

A processor is a computing device that executes instructions to operate upon data in a computer system. A processor implemented on a single-chip is sometimes referred to as a "microprocessor". The data and instructions used by a processor are generally stored in memory. The circuitry responsible for fetching and decoding instructions is often referred to as the "front end" of the processor. One problem associated with many processors is that of reducing or limiting power consumption in the processor. This problem is becoming increasingly more difficult to solve as processor clock speeds increase and as the number of transistors used to implement processors increase.

Many modern processors include one or more cache memories to allow faster access to frequently used instructions and data. Commonly, such caches include both an instruction cache and a data cache. A cache normally includes a tag array containing the address tags of cached information and a data array containing the cached information. Each time data is fetched from the cache, power is consumed. Accesses to an instruction cache, therefore, contribute to the overall power consumption in the processor front end.

A processor which uses virtual addressing may also include a translation look-aside buffer (TLB). The TLB contains a mapping (e.g., a look-up table) of virtual addresses to physical addresses. The mapping is commonly divided into units of memory called "pages". Each time a look-up is made to the TLB, power is consumed. Hence, accesses to an instruction TLB also contribute to the overall power consumption in the processor front end.

Despite the fact that code flow is often linear (incremental, or sequential), existing processors will continually perform look-ups to the tag array and data array of the instruction cache, and to the TLB, even if the entry being accessed is not changing. The reason for this is that the instruction fetch size is less than an entire cache line or, in the case of the TLB, less than an entire page. This approach may be dictated by the instruction queue topology, cache line size, instruction width, routing limitations, etc., however, it also has a wasteful effect on power usage. A potential solution to this problem is to increase the instruction fetch size. That approach might provide some benefit, however, as the fetch size increases, the chances of fetching unneeded code (due to spatial locality) increases, and again power can be wasted. Also, increasing the fetch size can increase bus widths and cache area costs. Hence, a better solution to reducing power consumption in a processor front end due to instruction cache and TLB accesses is needed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for reducing power consumption due to instruction cache and instruction TLB accesses in a processor are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

The power reduction technique described herein applies to a processor that includes, or has access to, an instruction cache and/or an instruction TLB. As described in greater detail below, instruction cache accesses are limited to occur only once each time the instruction stream crosses a cache line boundary, and TLB look-ups are limited to occur only once each time the instruction stream crosses a page boundary. Also as described in greater detail below, the technique addresses power consumption during both sequential code execution and branching. For code branching, a branch predictor in the processor is configured to include, for each target address, an indication of whether the target address is in the same page as the corresponding branch address. When a branch subsequently occurs so as to cause access to a given branch predictor entry, the TLB is disabled if the target address is in the same page as the corresponding branch address.

Figure 1A:
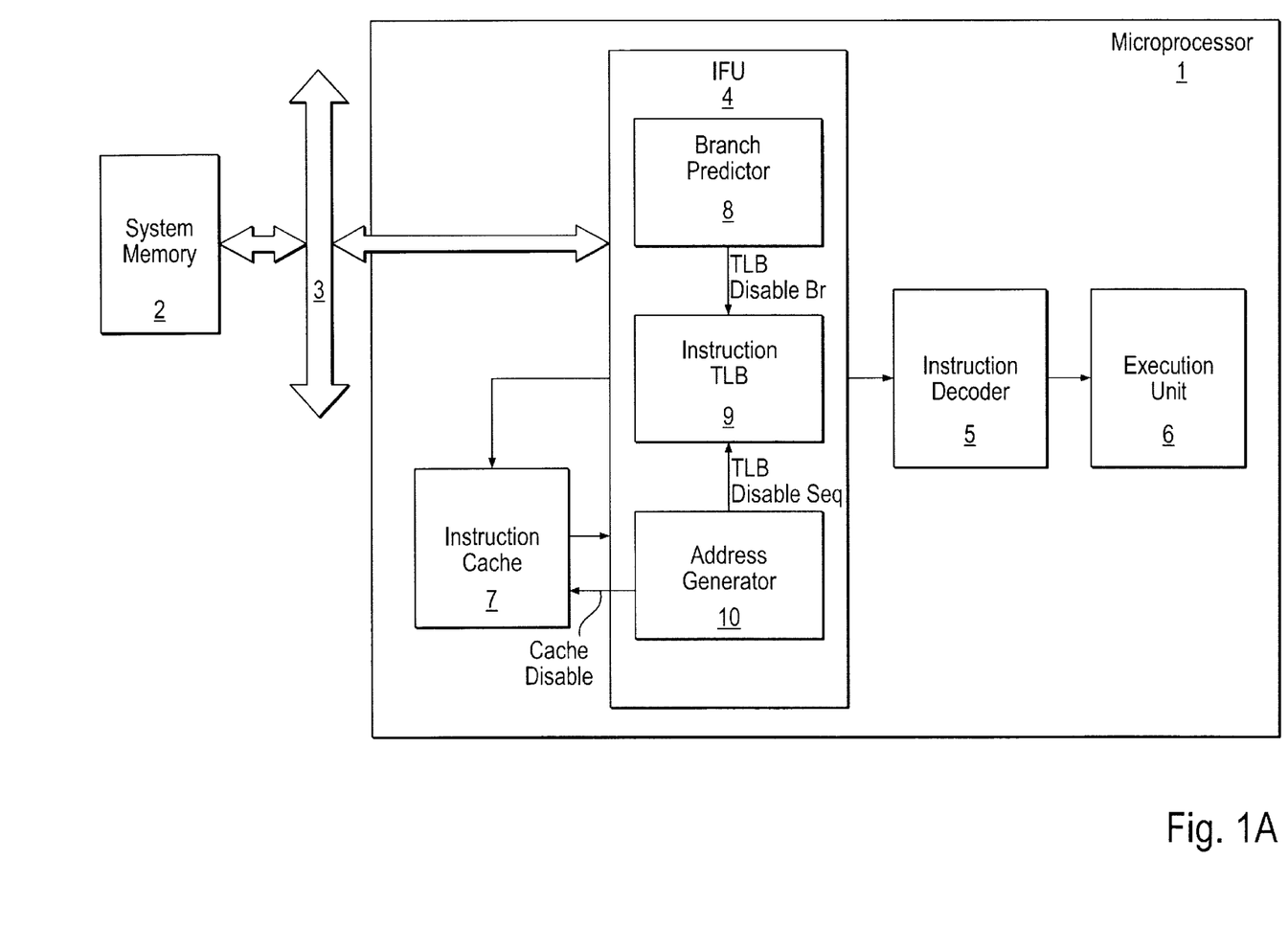
FIG. 1A is a block diagram of a microprocessor front end in which the instruction cache and instruction TLB are selectively disabled to reduce power consumption.

FIG. 1A shows, in block diagram form, a microprocessor 1 in which the instruction cache and TLB are selectively disabled to reduce power consumption. As shown, the microprocessor 1 is coupled within the computer system to a system memory 2 over a system bus 3. The computer system may be any conventional computer system, such as a personal computer (PC), a hand-held device such as a Personal Digital Assistant (PDA), cellular/wireless telephone, or the like. The microprocessor 1 may be a conventional microprocessor, such as found in such computer systems, such as a programmable, general-purpose microprocessor, Digital Signal Processor (DSP), or the like. The front end of the microprocessor 1 includes an Instruction Fetch Unit (IFU) 4, an instruction decoder 5, and an instruction cache 7. In operation, the IFU 4 fetches instructions from either system memory 2 or instruction cache 7. The instruction decoder decodes the fetched instructions, which are then executed by execution unit 6 in the microprocessor 1. The microprocessor 1 may be pipelined, in which case one or more instructions are executed while others are being fetched and decoded.

Figure 1B:
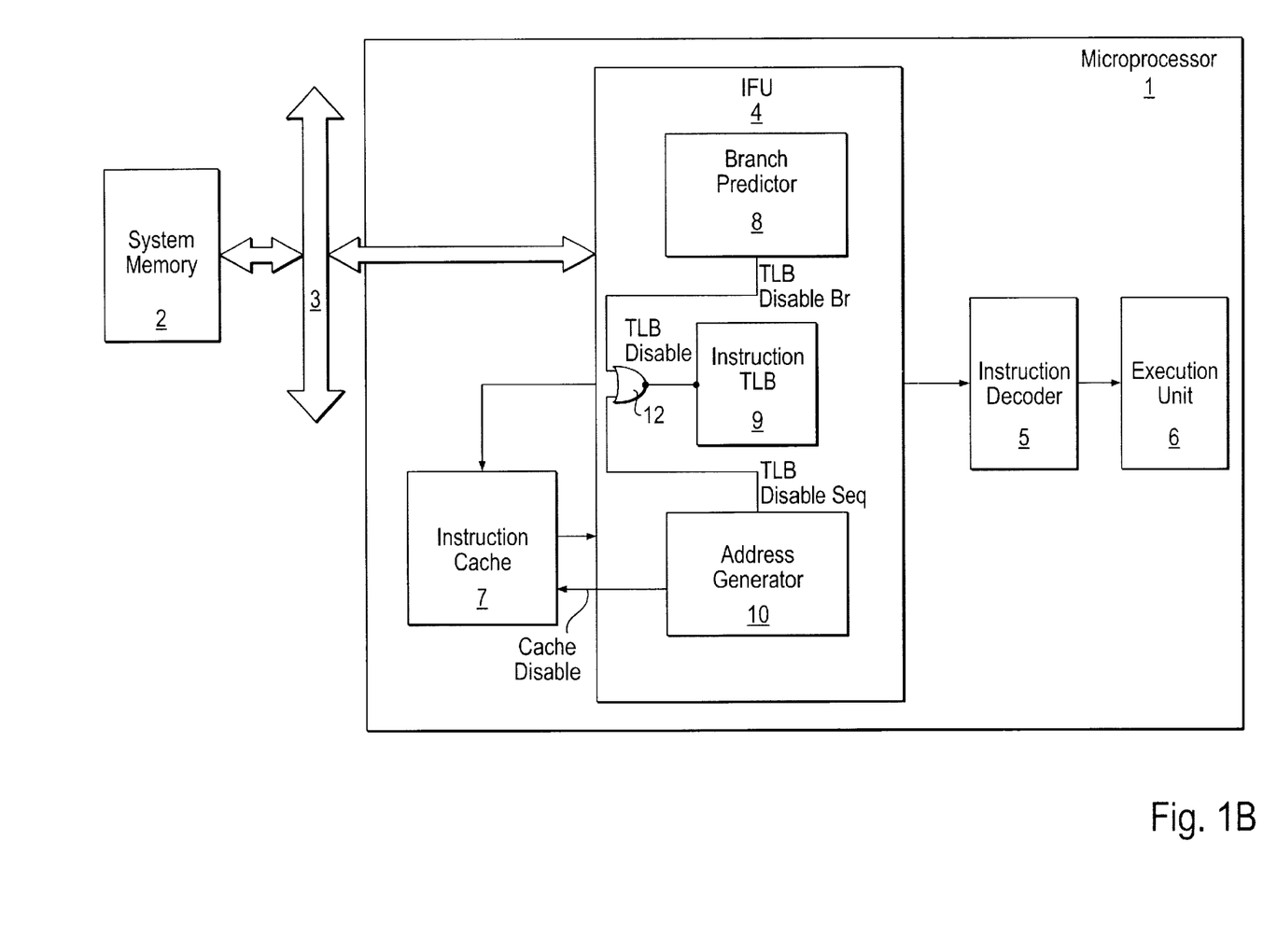
FIG. 1B illustrates a variation of the microprocessor of FIG. 1A.

The IFU 4 includes an address generator 10 to generate addresses of instructions to be fetched, a branch predictor 8, and an instruction TLB 9. Branch predictor 8 performs conventional branch prediction functions such as are well-known in the art, in addition to the operations described below. The address generator 10 also provides a Cache Disable signal to the instruction cache 7 to selectively disable the instruction cache (both its tag array and its data array) for sequential code execution. The instruction TLB 9 is coupled to receive a TLB DisableBr signal from the branch predictor 8 and a TLB DisableSeq signal from the address generator 10. The TLB DisableBr signal is used to selectively disable the instruction TLB 9 for instruction branching, while the TLB DisableSeq signal is used to selectively disable the instruction TLB 9 for sequential code execution. Note that while both signals TLB DisableBr (for branching) and TLB DisableSeq (for sequential execution) are shown and described herein, in various embodiments, only one of these signals may be generated and used. However, it is believed that using both signals (e.g., combining them together to disable the instruction TLB 9) will be more effective at reducing power consumption in the front end than using only one of them. As shown in FIG. 1B, these two disable signals TLB DisableBr and TLB DisableSeq may be combined, such as through an OR gate 12, to provide a single disable signal TLB Disable to the TLB 9.

Figure 2:
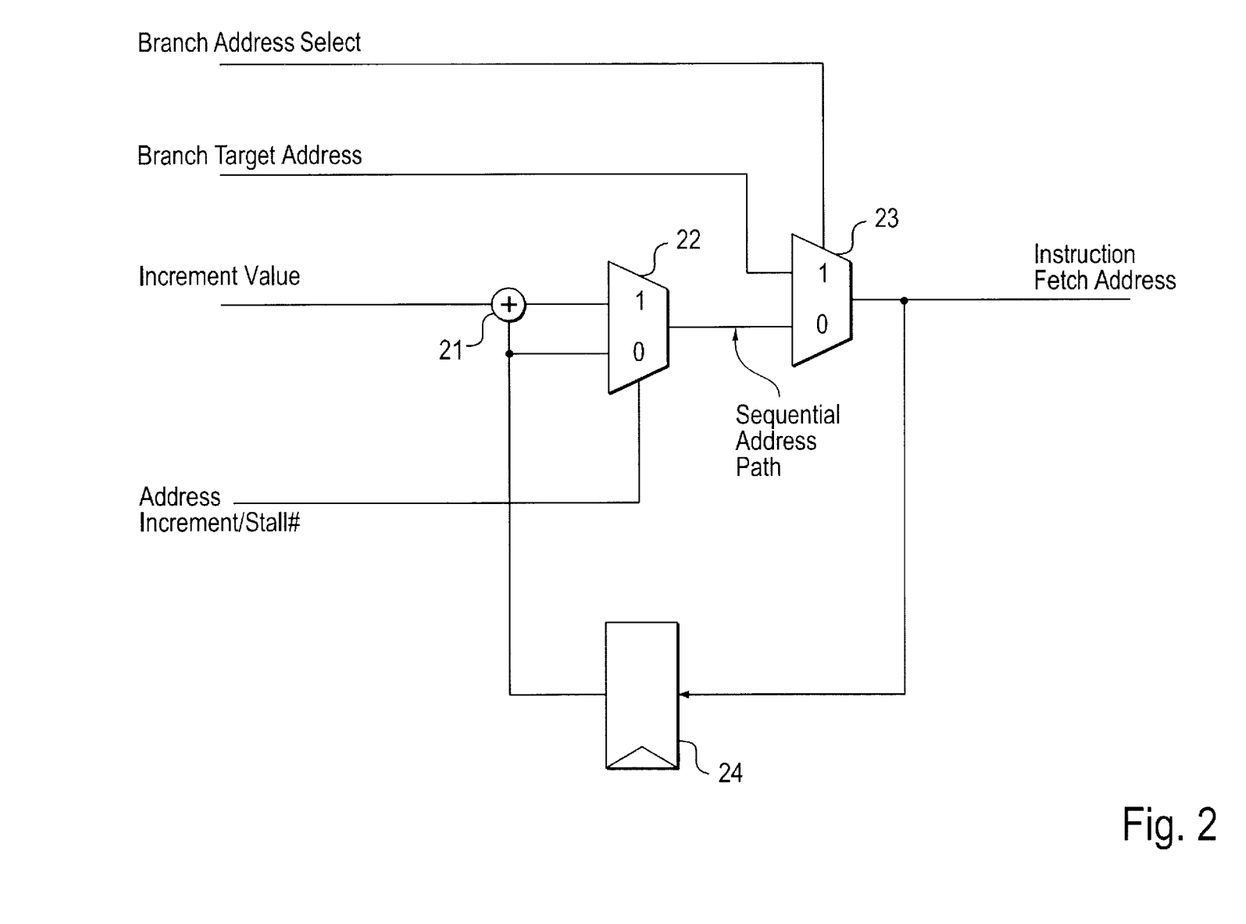
FIG. 2 shows an address generator of a processor Instruction Fetch Unit (IFU)

FIG. 2 shows an example of a conventional address generator that may be used in the IFU of a microprocessor. The address generator includes an incrementor 21, two-input multiplexers 22 and 23, and a one clock cycle buffer 24. The output of multiplexer 23 is the Instruction Fetch Address of the next instruction to be fetched, which is applied to the input of the buffer 24. The output of the buffer 24 is applied to one input of the incrementor 21, a second input of which receives the Address Increment Value. The output of incrementor 21 is applied to one input of multiplexer 22, the other input of which receives the output of buffer 24. The output of multiplexer 22 is applied to one input of multiplexer 23. Sequential instruction addresses are generated using the incrementor 21, by incrementing the previously generated Instruction Fetch Address from buffer 24. Instruction branch addresses are generated by the Branch Predictor 8. The Branch Address select and Address Increment/Stall# signals are used to cause the Instruction Fetch Address to be as set forth in the following table:

| Branch Address Select | Address Increment/Stall# | Resulting Instruction Fetch Address |
|---|---|---|
| 0 | 0 | Previous Instruction Fetch Address (Stall) |
| 0 | 1 | Incremental Instruction Fetch Address |
| 1 | 0 | Instruction Branch Address |
| 1 | 1 | Instruction Branch Address |

Figure 3:
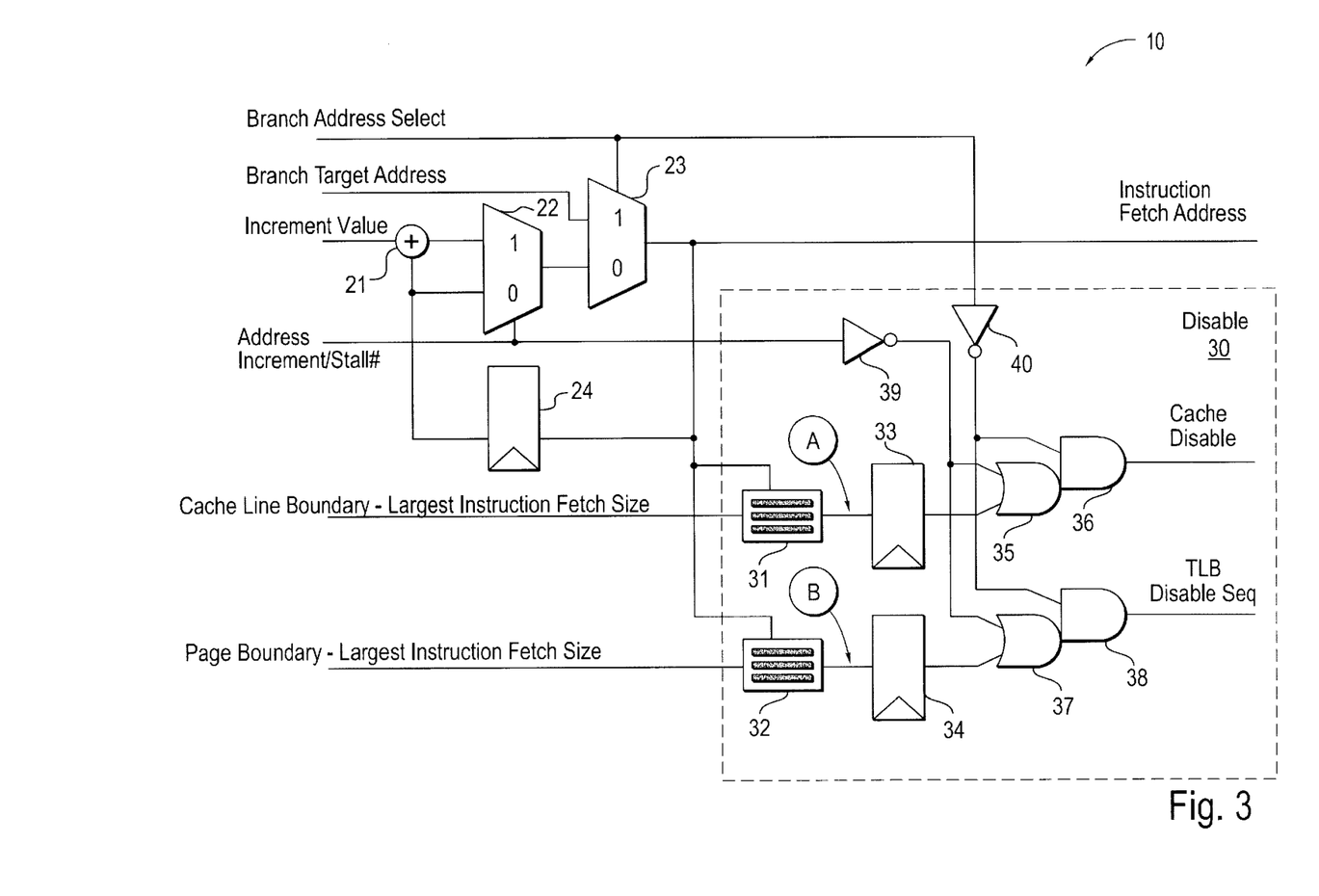
FIG. 3 shows an address generator of a processor IFU, configured to generate signals to selectively disable the instruction cache and instruction TLB.

In contrast, FIG. 3 shows the address generator 10 of processor 1, which generates the signals Cache Disable and TLB DisableSeq to selectively disable the instruction cache 7 and TLB 9, respectively, for sequential code execution. Accordingly, the address generator 10 is essentially the same as the address generator shown in FIG. 2 except for the addition of disable circuitry 30 to generate the aforementioned disable signals. As shown, the disable circuit 30 includes comparators 31 in 32, one clock cycle buffers 33 and 34, OR gates 35 and 37, AND gates 36 and 38, and inverters 39 and 40. Each of comparators 31 in 32 receives, as one input, the current Instruction Fetch Address. As its second input, comparator 31 receives a value representing the cache line boundary minus the largest instruction fetch size. Comparator 32 receives, as its second input, a value representing the page boundary minus the largest instruction fetch size. Comparator 31 outputs a signal A to buffer 33, while comparator 32 outputs signal B to buffer 34. The output of buffer 33 is provided to one input of OR gate 35, the other input of which is the output of inverter 39. Inverter 39 outputs the inversion of the Address Increment/Stall# signal. The output of buffer 34 is provided to one input of OR gate 37, the other input of which is the output of inverter 39. The output of OR gate 35 is provided to one input of AND gate 36, the other input of which is the output of inverter 40. Inverter 40 provides inversion of the Branch Address Select signal. The output of OR gate 37 is provided to one input of AND gate 38, the other input of which is the output of inverter 40. The output of AND gate 36 is the Cache Disable signal, while the output of AND gate 38 is the TLB DisableSeq signal.

In operation, signal A represents a comparison of the current Instruction Fetch Address with: a cache line boundary minus the largest instruction fetch size. One clock cycle after an Instruction Fetch Address is generated, if the sequential (incrementing) address path is selected (Branch Address Select is "0" and Address Increment/Stall# is "1"), and the previous instruction fetch address was not within a fetch increment of crossing a cache line boundary, then the cache line being accessed must be the same as the cache line read by the last access, and a cache tag look-up is therefore unnecessary (unless the cache line has been modified). A cache tag look-up is also unnecessary if the Instruction Fetch Address is repeating (i.e., Branch Address Select is "0" and Address Increment/Stall# is "0"). Accordingly, the Cache Disable signal is asserted in such a case.

It is possible to make the Cache Disable function more accurate. For example, multiple comparators can be used to generate signal A, one comparator per possible fetch increment size, and the results can be multiplexed based upon the actual increment used. However, for some possible implementations, the vast majority of instruction fetches will be cacheable and, therefore, will use the largest fetch size. Thus, further optimization for such implementations would yield only a slight power improvement while adding logic to a potentially critical path (Cache Disable). The lack of this optimization would not cause incorrect behavior, only additional cache tag look-ups relative to an optimal solution.

Signal B represents a comparison of the current Instruction Fetch Address with: a page boundary minus the largest instruction fetch size. One clock cycle after an Instruction Fetch Address is generated, if the sequential (incrementing) address path is selected and the previous instruction fetch address was not within a fetch increment of crossing a page boundary, then the page being accessed must be the same as the page read by the last access, and a TLB look-up is therefore unnecessary (unless the TLB has been modified). A TLB look-up is also unnecessary if the instruction fetch address is repeating. In that case, the TLB DisableSeq signal is asserted.

Two possible alternatives for making the TLB DisableSeq function more accurate are as follows. First, multiple comparators can be used to generate signal B, one comparator per possible increment size, and then the results can be multiplexed based upon the actual increment used. As an alternative, the comparators can be modified to take into account the actual page size of the last page accessed, instead of performing the comparison based upon the boundary for a predetermined minimum (e.g., 4K byte) page size. However, with respect to the first alternative, assuming the vast majority of 64 byte instruction fetches are cacheable, they will use the largest fetch size. Thus, the first optimization would yield only a slight power improvement and add logic to a potentially critical path (TLB Look-up Disable).

As for the second optimization, adding logic to support variable page size comparisons would reduce the number of TLB look-ups by only a very small number compared to supporting only fixed page-size comparisons (assuming a linear code flow and 32-byte instruction fetches). Consider linear code flow with 32-byte fetches executing through a 16K block. If only 4K pages are supported, the number of TLB look-ups required to support the 512 fetches (16K/32) is four. If both 4K and 16K pages are supported, and the entire 16K block is represented by one 16K page, then the number of TLB look-ups required to support the 512 fetches is one, or a savings of three out of 512 look-ups. Thus, little power improvement is gained at a substantial logic cost. If these alternatives are not used, the result will not be incorrect operation, just additional TLB look-ups relative to a more optimal solution.

Figure 4:
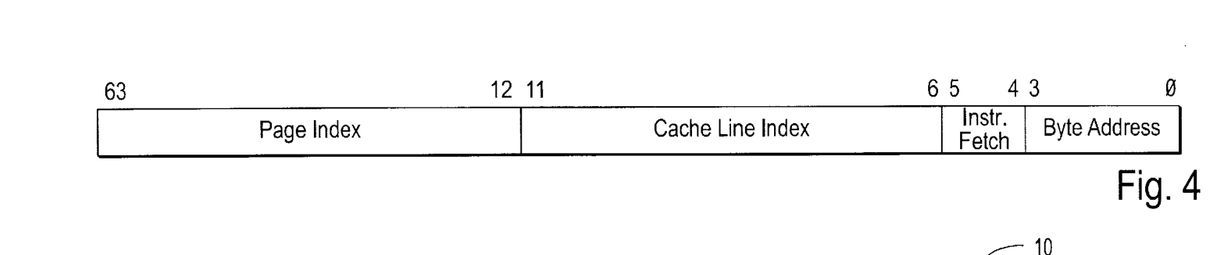
FIG. 4 shows the format of a 64-byte memory space of a processor.
Figure 5:
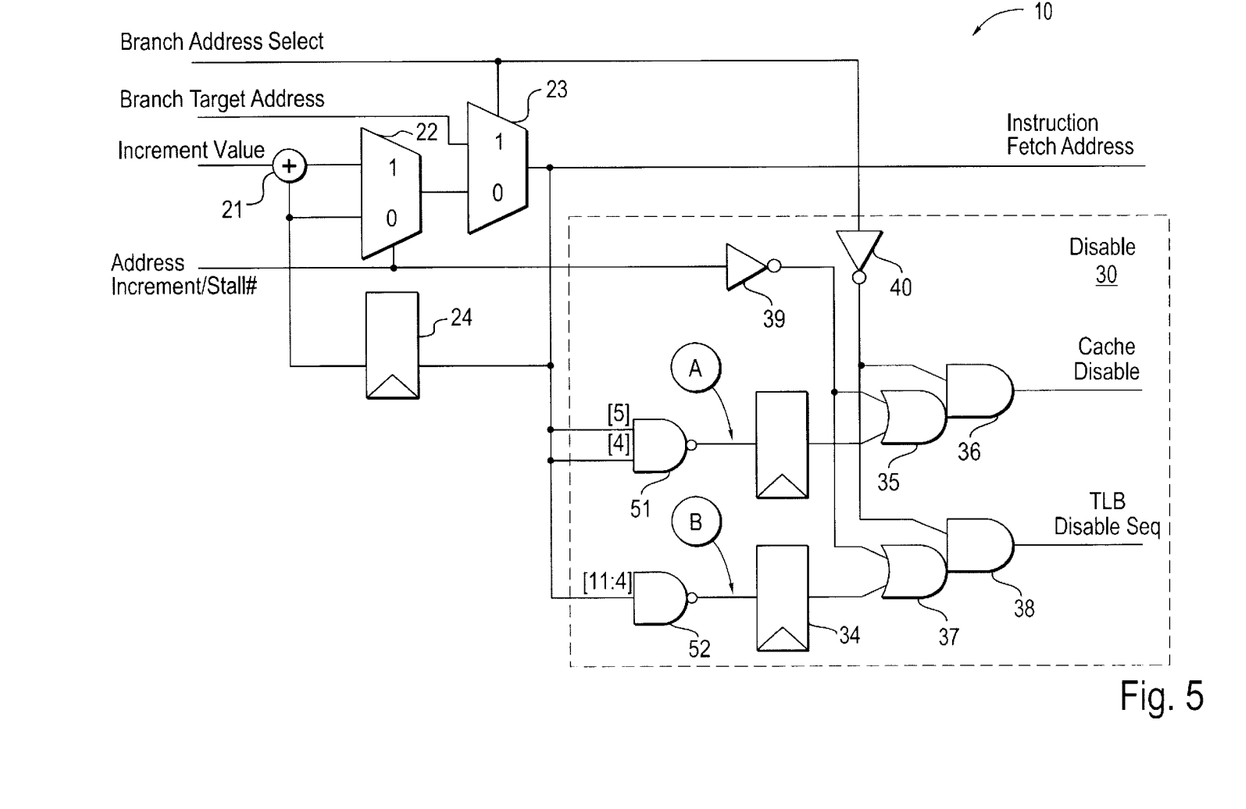
FIG. 5 shows a variation of the address generator of FIG. 3, in which comparators are replaced by simple logic gates.

In further alternative embodiments, the comparators 31 and 32 can be replaced by simple logic gates, such as the NAND gates 51 and 52 shown in FIG. 5. Before examining such an embodiment in greater detail, refer to FIG. 4, which schematically shows an example of a 64-bit address for a 64-bit addressable computer system. As shown, bits [12] through [63] of the address represent the index of a 4K-byte page within the memory space; bits [6] through [11] represent the index of a 64-byte cache line within a 4K-byte page; bits [4] and [5] represent the index of a 16-byte instruction fetch within a 64-byte cache line; and bits [0] through [3] represent the byte address within the 16-byte instruction fetch block. Referring now to FIG. 5, an alternative embodiment of the address generator 10 is shown. If the largest instruction fetch size is 16 bytes and a cache line is 64 bytes, then signal A will be active if any of the Instruction Fetch Address bits that form the index of the instruction fetch within a cache line are "0". In this example, signal A in FIG. 5 would be active if either bit [5] or bit [4] (or both) of the current Instruction Fetch Address is "0". Hence, in the embodiment of FIG. 5, bits [4] and [5] are input to NAND gate 51, which replaces comparator 31 in FIG. 3.

Similarly, if the largest instruction fetch size is 16 bytes and a page is 4K bytes, then signal B will be active if any of the bits that form the index of a cache line within a page as well as the bits that form the index of the instruction fetch within a cache line are "0". In this example, signal B in FIG. 5 would be active if any of bits [4] through [11] of the current Instruction Fetch Address are "0". Hence, in the embodiment of FIG. 5, bits [4] through [11] are input to NAND gate 52, which replaces comparator 32 in FIG. 3.

Figure 6:
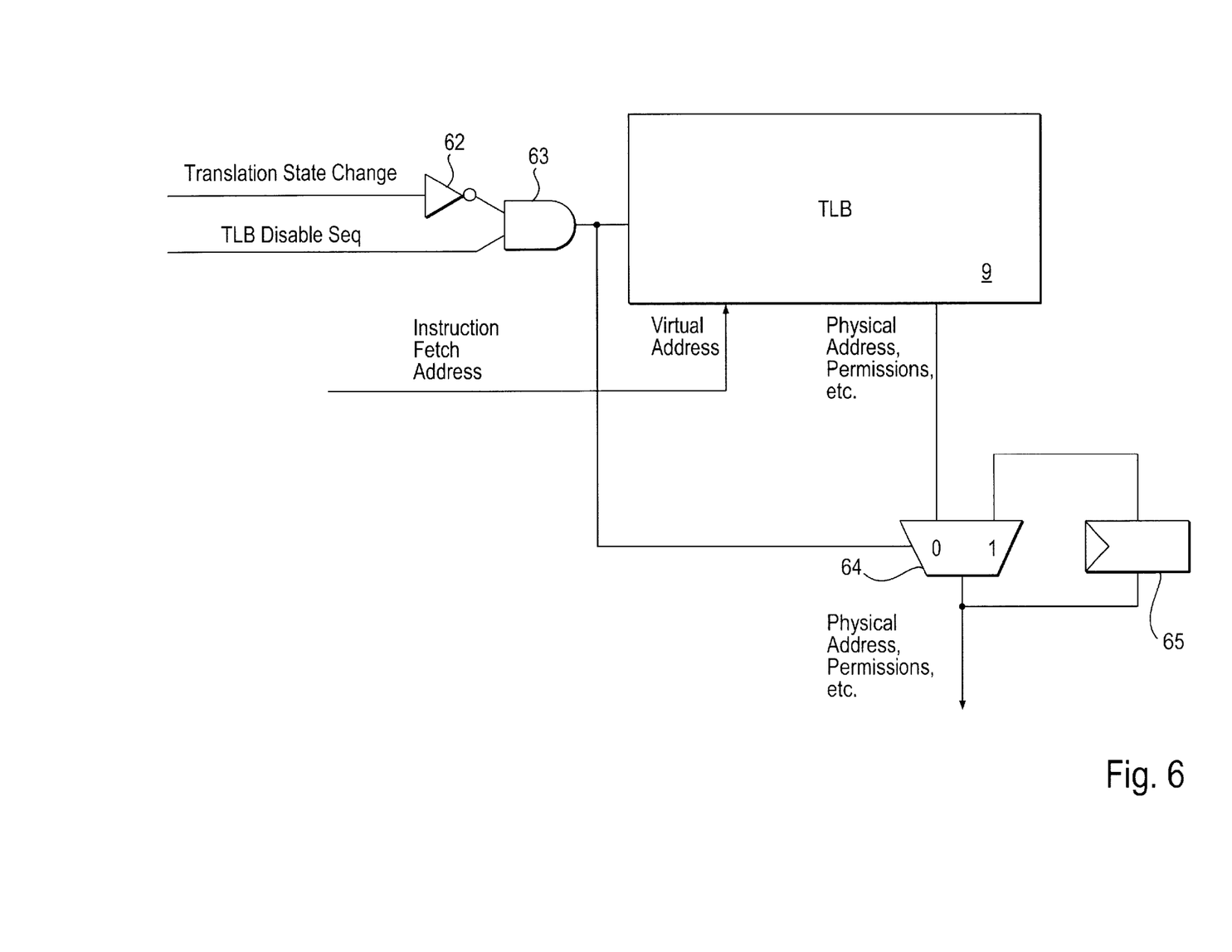
FIG. 6 illustrates how the instruction TLB can be selectively disabled for sequential code execution.

FIG. 6 illustrates how the TLB DisableSeq signal can be used to selectively disable the TLB 9 for sequential code execution. As shown, the TLB DisableSeq signal is applied to one input of a two-input AND gate 63, the other input of which is the output of an inverter 62. The input of inverter 62 is a Translation State Change signal, the purpose of which is described below. The output of AND gate 63 is applied to the TLB 9 to selectively disable the TLB 9. The output of AND gate 63 is also applied as a selection signal to the two-input multiplexer 64. The "0" input of the multiplexer 64 is the output (i.e., physical address, permissions, etc.) of the TLB 9. The "1" input of multiplexer 64 is the output of multiplexer 64 fed back through a one clock cycle buffer 65.

In operation (when the instruction queue has available space), Instruction Fetch Addresses are continually fed to the instruction cache 7 and the instruction TLB 9. With the addition of the TLB disable logic described above, the Instruction TLB is modified such that when the output of AND gate 63 is asserted ("1"), the Content Addressable Memories (CAMs) (not shown) of the TLB 9 do not evaluate and the TLB 9 is not read. Instead, the Physical Address bits [12] through [x] (where x is the most significant physical address bit supported), permissions, etc., are supplied by buffer 65, which contains the most recently read information from the TLB 9. It may not be necessary to save the permissions, etc. by noting that if the previous access did not have any TLB-related faults (and the current privilege levels etc. have not changed), then the current access to the same page cannot have any TLB-related faults either.

In addition to the TLB DisableSeq signal, the Translation State Change signal is used (generated by logic not shown), when desired, to force the TLB to perform a look-up for a given access regardless of the value of the TLB DisableSeq signal. The Translation State Change signal is asserted in the event of a processor state change that could cause previously read page information to be considered stale. It remains asserted until a subsequent TLB access is performed and the last read TLB information in buffer 65 can be updated.

Figure 7:
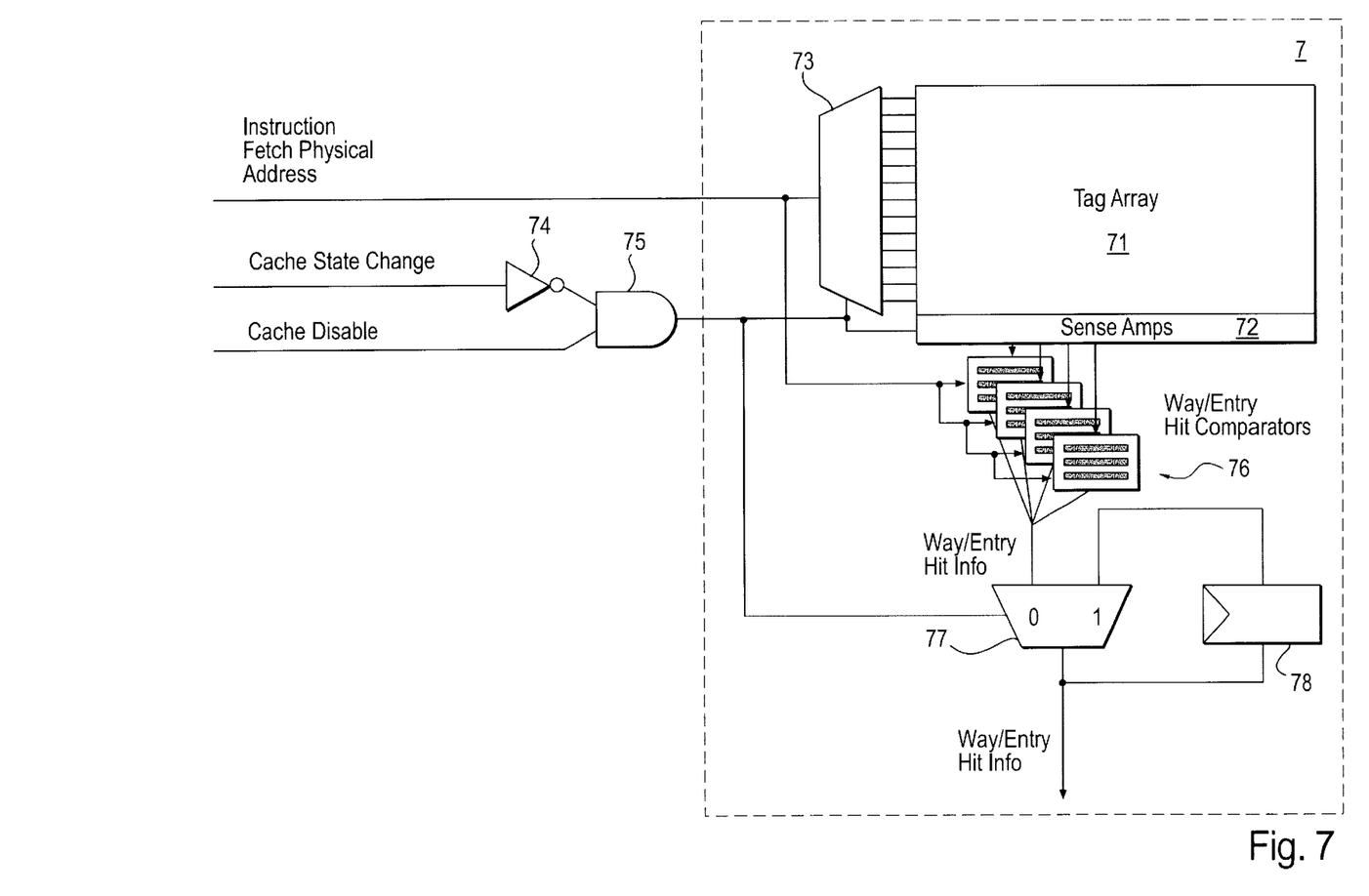
FIG. 7 illustrates how the instruction cache tag array can be selectively disabled for sequential code execution.

FIG. 7 illustrates how the Cache Disable signal can be used to selectively disable the tag array of the instruction cache 7 for sequential code execution. As shown, the Cache Disable signal is applied to one input of a two-input AND gate 75, the other input of which is the output of an inverter 74. The input of inverter 74 is a Cache State Change signal, the purpose of which is described below. The output of AND gate 75 is applied to the cache tag decoders 73 and cache tag array sense amplifiers 72 of the instruction cache 7 to selectively disable the cache tag array 71. The output of AND gate 75 is also applied as a selection signal to the two-input multiplexer 77. The "0" input of the multiplexer 64 is the output of the way/entry hit comparators 76. The "1" input of multiplexer 77 is the output of multiplexer 77 fed back through a one clock cycle buffer 78.

In operation (when the instruction queue has available space), Instruction Fetch Addresses are continually fed to the instruction cache 7 and the TLB 9. With the addition of the cache disable logic described above, the instruction cache tag arrays are modified such that, when the output of AND gate 75 is asserted ("1"), the cache tag decoders 73 do not evaluate, the cache tag sense amplifiers 72 are disabled, and the cache way/entry hit comparators 76 do not perform cache hit/miss detections. Instead, the way/entry hit signals are supplied by buffer 78, which contains the most recently generated information from the cache tags.

The Cache State Change signal is used (generated by logic not shown), when desired, to force the cache tags to perform a look-up for a given access regardless of the value of the Cache Disable signal. It is asserted in the event of a processor state change that could cause previously read cache line information to be considered stale. It remains asserted until a subsequent cache access is performed and the last read cache information in buffer 78 can be updated. These cases may include: modification of the TLB 9 (if the cache is virtual), disabling/enabling of the cache 7 via software, or modification of the cache line currently being accessed.

Note that detection of modifications to the cache line currently being accessed can be achieved in a number of ways, but for architectures which support total store ordering rules, ordered stores which are perceived from external sources (different threads within a single processor appear as external sources) must reach visibility (affect the instruction cache) in order. For at least one contemplated 64-bit architecture, ordered stores which are initiated by the same processor and thread as the instruction fetch are not guaranteed to be seen by the instruction cache at all, until a Flush Cache operation to the same address as the ordered store is executed, followed by an Instruction Serialization. (An Instruction Serialization causes a pipeline flush and a flush of any instruction prefetching buffers, followed by a branch to the address immediately following the Instruction Serialization instruction once the Instruction Serialization is architecturally committed.)

To account for store ordering rules, plus possible cache line modifications, some detection methods are as follows. As a first approach, assume that all snoops to the instruction cache would modify the current access line. Instruction Serialization operations appear as branches. This approach is simple, but is less power efficient than more exacting approaches. However, if the cache line size and the instruction fetch sizes are relatively close (e.g., the cache line size is two to four times the fetch size), then the incidence of snoops relative to the incidence of cache line crossings may be small. This method is only a partial solution, since cache line replacements will still result in a "modification to a cache line" (actually a modification to a cache line location), without a snoop being generated. To complete this solution, cache lines targeted for replacement would have to count as "snoops" (although these "snoop" detections could be made exact, i.e., count only if to the current line being accessed with a smaller cost than that of the third approach, below).

As a second approach, assume that all external snoops to the instruction cache (including snoops generated by other threads of the same processor) would modify the current access line. Instruction Serialization operations appear as branches. This approach is also simple, but is less power efficient than more exacting approaches. However, if the cache line size and the instruction fetch sizes are relatively close (e.g., the cache line size is two to four times the fetch size), then the incidence of snoops relative to the incidence of cache line crossings may be small. This method is also only a partial solution, since cache line replacements will still result in a "modification to a cache line" (actually a modification to a cache line location), without a snoop being generated. To complete this solution, cache lines targeted for replacement would have to count as "snoops" (although these "snoop" detections could be made exact, i.e. count only if to the line being accessed with a smaller cost than that of the fourth approach, below).

As a third approach, only snoops which hit the current access line count as modifications to the line. Instruction Serialization operations appear as branches. This approach requires some form of index/way comparator to provide detection (added complexity/area/power). Again, this method is only a partial solution, since cache line replacements will still result in a "modification to a cache line" (actually a modification to a cache line location), without a snoop being generated. To complete this solution, cache lines targeted for replacement would have to count as "snoops".

As a fourth approach, only external snoops which hit the current access line count as modifications to the line. Instruction Serialization operations appear as branches. This approach also requires some form of index/way comparator to provide detection (added complexity/area/power). Again, this method is only a partial solution, since cache line replacements will still result in a "modification to a cache line" (actually a modification to a cache line location), without a snoop being generated. To complete this solution, cache lines targeted for replacement would have to count as "snoops".

Figure 8:
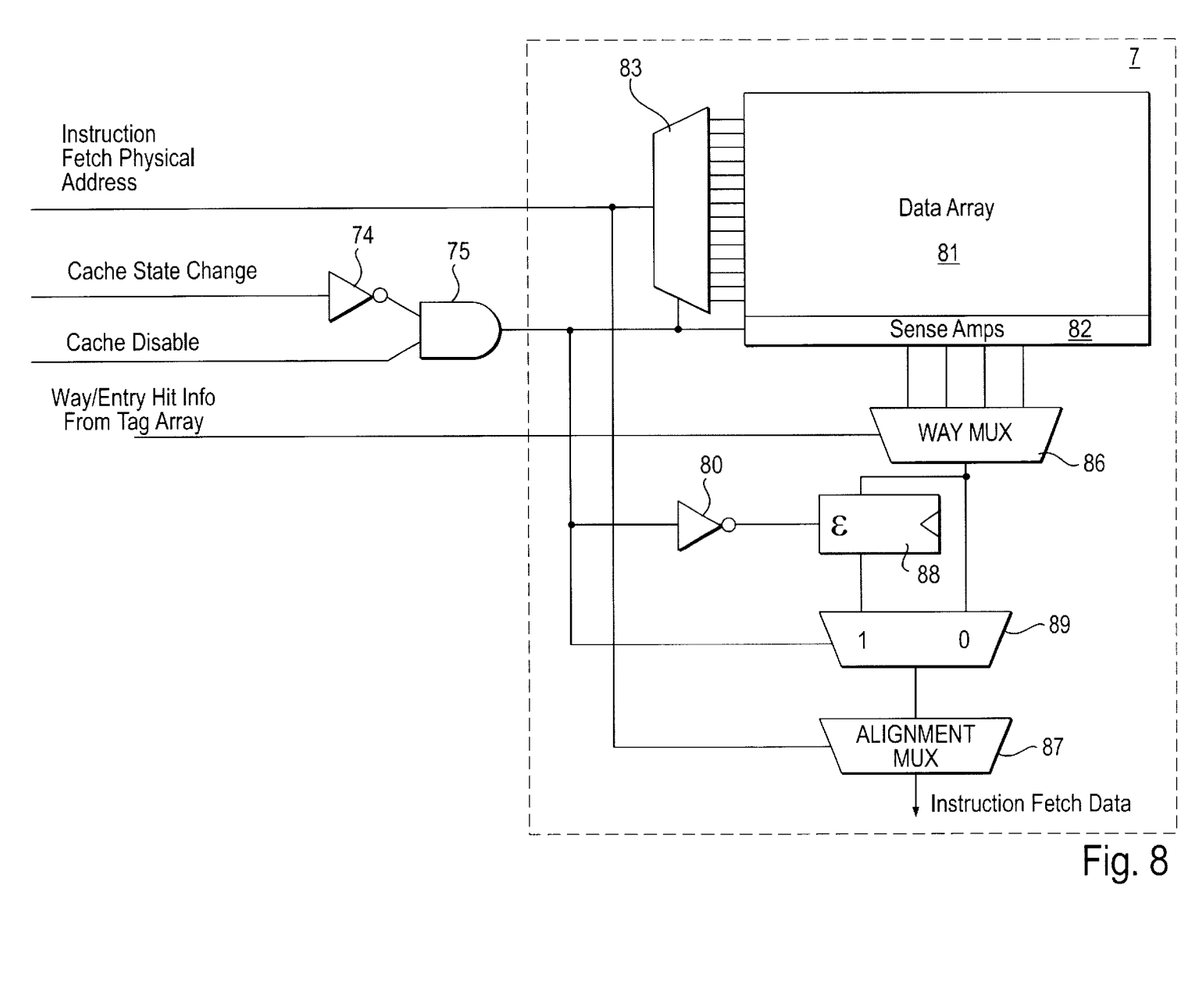
FIG. 8 illustrates how the instruction cache data array can be selectively disabled for sequential code execution.

FIG. 8 illustrates how the Cache Disable signal can be used to selectively disable the data array of the instruction cache. The data array 81 stores instructions represented by the tags stored in the tag array 71. As shown, the output of AND gate 75 is applied to the cache data array decoders 83 and cache data array sense amplifiers 82 of the instruction cache 7, to selectively disable the data array 81. The output of AND gate 75 is also applied as the selection signal to the two-input alignment multiplexer 89 and as input to inverter 80. The output of inverter 80 is used as the enable input of buffer 88. The four-input Way multiplexer 86 receives an input from each of the four ways of the instruction cache 7, and is controlled by a multi-bit Way/Hit Information selection signal formed by the outputs of the way/entry hit comparators 76 (FIG. 7). The output of Way multiplexer 86 is applied to one input of multiplexer 89, and also to a second input of multiplexer 89 through enabled buffer 88. The output of multiplexer 89 (a cache line of data) is then fed to alignment multiplexer 87, which is used to select the instruction fetch sub-block from within the line.

In operation (when the instruction queue has available space), Instruction Fetch Addresses are continually fed to the instruction cache 7 and the TLB 9. With the addition of the cache disable logic described above (the same signal used by the cache tags), the data array 81 of the instruction cache 7 can be modified such that when the output of AND gate 75 is asserted ("1"), the data array decoders 83 do not evaluate and the sense amplifiers 82 are disabled. Instead, the data for multiplexer 89 is supplied by buffer 88 containing the last cache line read from the data array 81. With this modification, instead of reading a partial cache line from the data array 81 each time an instruction fetch is requested (and using the alignment multiplexer 87 to select which sub-block of the data read is to be passed to the instruction queue), an entire line is read each time an instruction fetch is requested. The line is then simultaneously passed to multiplexer 89 and enabled buffer 88. The output of multiplexer 89 is passed to the alignment multiplexer 87 to select which sub-block of the data read is to be passed to the instruction queue. Subsequent accesses to the same cache line will then be satisfied by the line buffer 88. As with the tag array 71, the Cache State Change signal can be used to force the data array 81 to perform a look-up for a given access regardless of the value of the Cache Disable signal. Ideally, multiplexers 89 and 87 would be combined into a single level.

While various schemes may be used to reduce redundant accesses to the instruction cache 7 and TLB 9 when the instruction stream is flowing serially, it is also desirable to have a technique to reduce redundant accesses to these structures as a result of branches. Although a branch will frequently cause a change in which cache line the instruction stream is fetching, branches are much less likely to cause page transitions. One way of addressing this problem is to compare the branch predictor virtual address output with the last instruction fetch virtual address to detect if they were to the same page. However, this approach could require large (e.g., 72-bit) CAMs to be placed in the critical path of the branch predictor address generation. To avoid this logic, its timing effects, and to save power, a branch page predictor may be used, as will now be described.

Figure 9:
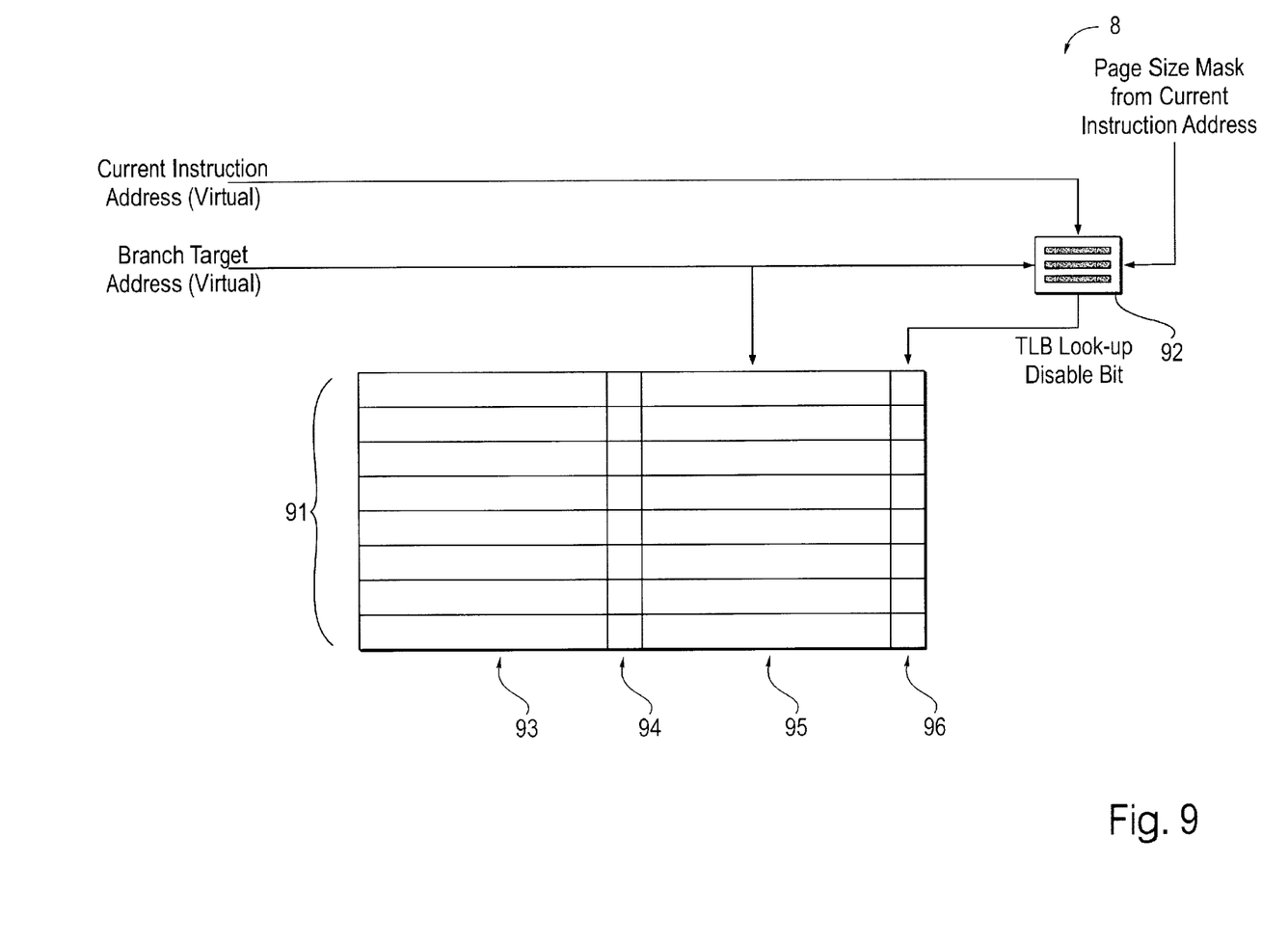
FIG. 9 illustrates the inclusion of a TLB disable bit in the branch predictor.

FIG. 9 schematically illustrates the branch predictor 8 of microprocessor 1. As indicated above, however, the use of this power reduction technique for branching is optional. As shown, the branch page predictor 8 includes a branch prediction table 91 and a comparator 92. The branch prediction table 91 includes a number of entries, each of which includes a branch address 93, a valid bit 94 indicating whether the entry is currently valid, the target address 95 corresponding to the branch address 93, and a TLB Look-up Disable bit 96. Optionally, the branch prediction table 91 may also include branch history information (not shown) for each entry. In operation, when a new entry is placed into the branch prediction table 91, comparator 92 makes a comparison between the virtual address of the current branch instruction (the instruction used to initiate branch prediction) and the target virtual address, masked by the current page size, to determine whether or not the branch address and its corresponding target address are within the same virtual page. If they are, then the comparator 92 sets the TLB Look-up Disable bit for the new branch predictor entry. Later, when the branch predictor 8 is used, the TLB Look-up Disable bit will be read out with the target address, such that the front end logic will know whether or not a new TLB look-up is required, or whether instead, previously retrieved information can be used. For branch addresses not supplied by the branch prediction table (such as in the event of a branch mispredict), a TLB look-up will be required, and TLB Look-up Disable would not be asserted.

Note that this technique does not require a determination of whether the current fetch and the last fetch are in the same page to be made at the time of an instruction fetch, which is a timing-critical point in the front-end process. Instead, the comparison is made and stored prior to fetch time. Further, this technique avoids re-comparison for each fetch, which tends to further reduce power consumption. (Note that the same code may be executed several times, such as in a procedure.)

For some implementations, the TLB Look-up Disable bits may be continually updated each time a branch predictor entry is added or verified after use. Thus, TLB look-ups can be reduced even when branching, with minimal logic additions, and without adding any logic to the critical paths of the branch predictor 8. Note that in the case where page mappings are changed/modified, it is possible that page sizes can change. In this case, the TLB Look-up Disable bits would have to be cleared for the affected pages (until new comparisons could be made and the bits updated). Alternatively, it may be more area-efficient to clear all TLB Look-up Disable bits 96 each time the page mappings are changed/modified (until new comparisons could be made and the bits updated).

Figure 10:
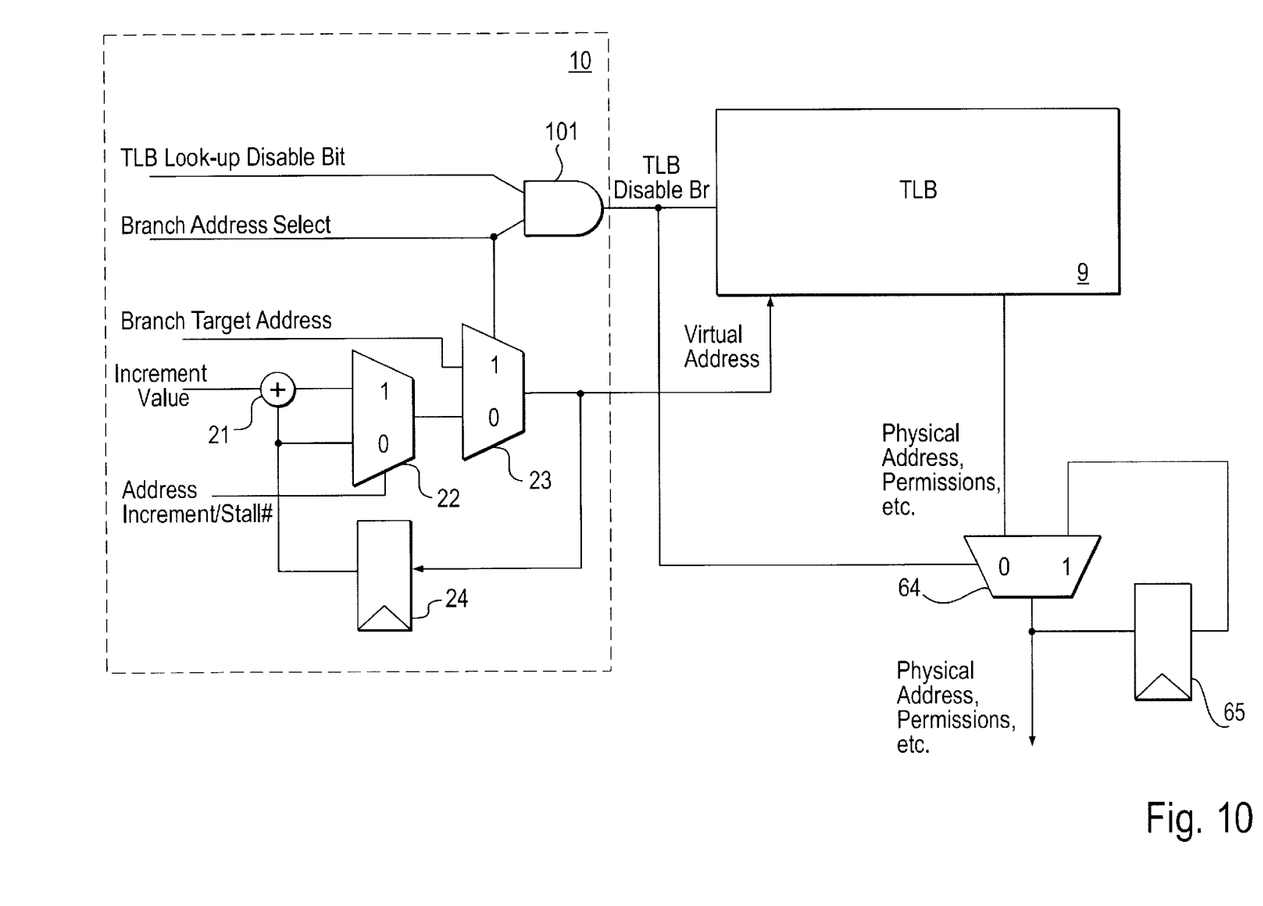
FIG. 10 illustrates how the instruction TLB can be selectively disabled for code branching.

FIG. 10 illustrates how a TLB Look-up Disable bit can be used to selectively disable the TLB 9 for code branching. As shown, the TLB look up disable bit is applied in the address generator 10 to one input of an AND gate 101, the other input of which is the Branch Address Select signal. The output of AND gate 101 is the TLB DisableBr signal, which is applied to the TLB 9 to selectively disable the TLB 9 (i.e., when the target address is in the same page as the branch address). Alternatively, as illustrated in FIG. 1B, the TLB DisableBr signal may be combined with the TLB DisableSeq signal using a logic (e.g., OR) gate.

Various adaptations can be made to this TLB disabling technique for code branching. For example, instead of dealing with multiple page sizes, the comparator 92 can be made to only support the minimum page size. With this adaptation, branches that cross the minimum page size boundary but are actually in the same page as the current instruction will still cause TLB look-ups, however, changes/modifications to the page mappings will not require any TLB Look-up Disable bits to be cleared. Thus, the TLB Look-up Disable bits will only need to be modified when a new branch predictor entry is created. Additionally, the comparator would be simplified. Most branches will still be covered with this adaptation.

As another adaptation, two or more bits could be used to indicate TLB Look-up Disable. For example, one bit may be used to indicate whether the target address is in the same page as the branch address when the minimum page size is currently in use, while a second bit may be used to indicate whether the target address is in the same page as the branch address when a larger-than-minimum page size (current page size) is being used. If either bit is set, the branch target address will not require a new TLB look-up. One bit supports multiple page sizes, as described earlier, while the other supports the minimum page size as described in the previous adaptation. For this case, in the event that page mappings are changed/modified, all TLB Look-up Disable Bits supporting multiple page sizes can be cleared (without determination as to whether they belong to one of the affected pages) with minimal effect, since the TLB Look-up Disable Bits supporting only the minimum page size will remain unchanged (they would still be updated as new comparisons were made later).

Thus, a method and apparatus for reducing power consumption due to instruction cache and TLB accesses in a processor have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A processor comprising:
   a translation look-aside buffer (TLB); and
   a disable circuit to selectively disable the TLB by maintaining a plurality of branch addresses and, for each of the branch addresses, a corresponding target address and a corresponding TLB disable bit, setting the value of each of the TLB disable bits based on whether each target address is on the same page as the corresponding branch address, and selectively disabling the TLB for an instruction branch based on the value of one of the TLB disable bits which corresponds to the instruction branch.

2. A processor comprising:
a translation look-aside buffer (TLB);
a branch predictor including;
  a plurality of branch addresses and, for each of the branch addresses, a corresponding target address and a corresponding TLB disable bit, and
  a comparator to set the value of each of the TLB disable bits based on whether each target address is on the same page as the corresponding branch address;
a disable circuit to selectively disable the TLB for an instruction branch based on the value of the TLB disable bit corresponding to the instruction branch; and
for each of the branch addresses, a second TLB disable bit to support a plurality of different page sizes.

3. A processor as recited an claim 2, wherein each said TLB disable bit is for use in disabling a TLB for instruction branches that do not cross a page boundary.

4. A processor comprising a branch predictor, the branch predictor including a plurality of entries, each of the entries including a branch address, a target address corresponding to the branch address, and a plurality of translation look-aside buffer (TLB) disable bits corresponding to the branch address and the target address, wherein at least one of the plurality of TLB disable bits supports a plurality of page sizes.

5. A processor as recited in claim 4, wherein the TLB disable bit is for use in disabling a TLB for instruction branches that do not cross a page boundary.

6. A processor comprising:
an instruction fetch unit including an instruction address generator to selectively disable an instruction cache based on a current instruction fetch address, wherein the address generator includes
  a first logic element to determine whether the next instruction fetch address is in the same cache line as the current instruction fetch address by performing a logic operation on a first predetermined subset of the current instruction fetch address, and
  a cache disable circuit to disable the instruction cache if the next instruction fetch address is in the same cache line as the current instruction fetch address;
an instruction decoder;
an instruction execution unit;
an instruction translation look-aside buffer(TLB); and
a branch predictor, the branch predictor including:
  a plurality of branch addresses and, for each of the branch addresses, a corresponding target address and a corresponding TLB disable bit, and
  a comparator to set the value of each of the TLB disable bits by determining whether each target address is on the same page as the corresponding branch address.

7. A processor as recited in claim 6, wherein the instruction address generator further includes:
a second logic element to determine whether the next instruction fetch address is in the same page as the current instruction fetch address by performing a logic operation on a second predetermined subset of the current instruction fetch address, and
a TLB disable circuit to disable the TLB if the next instruction fetch address is in the same page as the current instruction fetch address.

8. A processor as recited in claim 6, further comprising a first TLB disable circuit to selectively disable the instruction TLB for an instruction branch based on the value of the TLB disable bit corresponding to the instruction branch.

9. A processor as recited in claim 8, wherein the instruction address generator further includes:
a third logic element to determine whether the next instruction fetch address is in the same page as the current instruction fetch address by performing a logic operation on a second predetermined subset of the current instruction fetch address, and
a second TLB disable circuit to disable the instruction TLB if the next instruction fetch address is in the same page as the current instruction fetch address.

10. A processor comprising:
an instruction cache;
an instruction translation look-aside buffer (TLB); and
an instruction fetch unit including an instruction address generator to selectively disable the instruction cache or the instruction TLB based on a current instruction fetch address, wherein the address generator includes
  a first logic element to determine whether the next instruction fetch address is in the same cache line as the current instruction fetch address by performing a logic operation on a first predetermined subset of the current instruction fetch address,
  a cache disable circuit to disable the instruction cache if the next instruction fetch address is in the same cache line as the current instruction fetch address,
  a second logic element to determine whether the next instruction fetch address is in the same page as the current instruction fetch address by performing a logic operation on a second predetermined subset of the current instruction fetch address,
  a TLB disable circuit to disable the instruction TLB if the next instruction fetch address is in the same page as the current instruction fetch address; and
a branch predictor including
  a plurality of branch addresses and, for each of the branch addresses, a corresponding target address and a corresponding TLB disable bit, and
  a comparator to set the value of each of the TLB disable bits by determining whether each target address is on the same page as the corresponding branch address.

11. A processor as recited in claim 10, further comprising a second TLB disable circuit to selectively disable the TLB for an instruction branch based on the value of the TLB disable bit corresponding to the instruction branch.

12. A microprocessor comprising:
(a) an instruction cache;
(b) an instruction translation look-aside buffer (TLB);
(c) an instruction fetch unit;
(d) an instruction decoder;
(e) an instruction execution unit;
(f) a branch predictor including
  (f)(1) a plurality of branch addresses and, for each of the branch addresses, a corresponding target address and a corresponding TLB disable bit, and
  (f)(2) a comparator to set the value of each of the TLB disable bits by determining whether each target address is on the same page as the corresponding branch address; and
(g) a disable circuit to selectively disable the instruction cache or the instruction TLB based on a current instruction fetch address, wherein the disable circuit includes
  (g)(1) a branch portion to selectively disable the instruction TLB for an instruction branch based on the value of the TLB disable bit corresponding to the instruction branch, and (g)(2) an address generator to selectively disable the instruction cache or the TLB during sequential instruction fetching, wherein the address generator includes (g)(2)(i) an instruction cache disable circuit including first determining means for determining whether the next instruction fetch address is in the same cache line as the current instruction fetch address, and cache disabling means for disabling the instruction cache if the next instruction fetch address is in the same cache line as the current instruction fetch address, and (g)(2)(ii) a TLB disable circuit including second determining means for determining whether the next instruction fetch address is in the current instruction fetch address, and TLB disabling means for disabling the instruction TLB if the next instruction fetch address is in the same page as the current instruction fetch address.

13. A microprocessor as recited in claim 12, wherein the first determining means comprises a logic gate to perform a logic operation of a partial subset of the current instruction fetch address, such that the cache disabling means disables the instruction cache if the output of the logic gate has a predetermined value.

14. A microprocessor as recited in claim 12, wherein the first determining means comprises a comparator to compare the current instruction fetch address with a difference between a cache line boundary and a largest instruction fetch size of the instruction fetch unit.

15. A microprocessor as recited in claim 12, wherein the second determining means comprises logic gate to perform a logic operation of a partial subset of selected bits of the current instruction fetch address, such that the first TLB disabling means disables the instruction TLB if the output of the logic gate has a predetermined value.

16. A microprocessor as recited in claim 12, wherein the second determining means comprises a comparator to compare the current instruction fetch address with a difference between a page boundary and a largest instruction fetch size of the instruction fetch unit.

* * * * *